(12) United States Patent
Sabanayagam

(10) Patent No.: US 10,182,048 B1
(45) Date of Patent: Jan. 15, 2019

(54) SYSTEMS AND METHODS FOR AUTOMATICALLY POPULATING ONE-TIME-PASSWORD INPUT FIELDS

(71) Applicant: Symantec Corporation, Mountain View, CA (US)

(72) Inventor: Umamaheswarii Sabanayagam, Tamil Nadu (IN)

(73) Assignee: Symantec Corporation, Mountain View, CA (US)

( * ) Notice: Subject to any disclaimer, the term of this patent is extended or adjusted under 35 U.S.C. 154(b) by 148 days.

(21) Appl. No.: 15/162,650

(22) Filed: May 24, 2016

(51) Int. Cl.
*H04L 29/00* (2006.01)
*H04L 29/06* (2006.01)
*H04W 4/14* (2009.01)

(52) U.S. Cl.
CPC ........ *H04L 63/0838* (2013.01); *H04L 63/102* (2013.01); *H04W 4/14* (2013.01)

(58) Field of Classification Search
CPC ............... H04L 63/0838; H04L 9/3228; H04L 63/0815
See application file for complete search history.

(56) References Cited

U.S. PATENT DOCUMENTS

2007/0174904 A1* 7/2007 Park .................. H04L 63/0838 726/7

FOREIGN PATENT DOCUMENTS

WO WO2012044260 * 4/2012

* cited by examiner

*Primary Examiner* — Ghazal B Shehni
(74) *Attorney, Agent, or Firm* — Fisher Broyles, LLP

(57) ABSTRACT

The disclosed computer-implemented method for automatically populating one-time-password input fields may include (1) detecting, at a first computing device of a user, an input field that requires a one-time password that is included in a message that is sent by a one-time-password provider to a second computing device of the user, (2) identifying, at the second computing device, the message that includes the one-time password, (3) transmitting the one-time password from the second computing device to the first computing device, (4) receiving, at the first computing device, the one-time password, and (5) automatically populating, at the first computing device, the input field with the one-time password. Various other methods, systems, and computer-readable media are also disclosed.

20 Claims, 6 Drawing Sheets

SYSTEMS AND METHODS FOR AUTOMATICALLY POPULATING ONE-TIME-PASSWORD INPUT FIELDS

BACKGROUND

Today, many websites use usernames and passwords to secure access to the information and services that they provide, and many users employ password managers to securely store and retrieve their usernames and passwords. In addition to securely storing usernames and passwords for a user, a typical password manager may automatically fill in username and password fields for the user whenever the password manager has previously stored the usernames and passwords required by these fields. For example, when a user enters a username and password into login fields of a website, a typical password manager may offer to store the username and password for later use. When the user subsequently visits the website and is required to reenter the username and password into the login fields of the website, the password manager may use the stored username and password to automatically fill in the login fields for the user.

Unfortunately, in addition to or as an alternative to using usernames and passwords to secure access to information and/or services, many websites employ One-Time Passwords (OTPs) that are sent to the mobile phones of their users as short-message-service (SMS) messages. For example, many transactional websites (e.g., the websites of financial institutions) may require that a one-time password be entered by a user each time the user attempts to perform a transaction on the websites. While typical password managers may automatically fill in username and password fields of websites using previously stored usernames and passwords, users typically must manually retrieve and enter one-time passwords. Unfortunately, having to manually retrieve and enter one-time passwords may be a significant inconvenience, especially for users that must perform many transactions that each require different one-time passwords and for users that do not have immediate access to the devices to which needed one-time passwords are sent. The instant disclosure, therefore, identifies and addresses a need for improved systems and methods for automatically populating one-time-password input fields.

SUMMARY

As will be described in greater detail below, the instant disclosure describes various systems and methods for automatically populating one-time-password input fields. In one example, a computer-implemented method for automatically populating one-time-password input fields may include (1) detecting, at a first computing device of a user, an input field that requires a one-time password that is included in a message that is sent by a one-time-password provider to a second computing device of the user, (2) identifying, at the second computing device, the message that includes the one-time password, (3) transmitting the one-time password from the second computing device to the first computing device, (4) receiving, at the first computing device, the one-time password, and (5) automatically populating, at the first computing device, the input field with the one-time password. In certain embodiments, the first computing device may be a personal computer of the user, the second computing device may be a mobile phone of the user, and the message may be a short-message-service message. In some embodiments, the input field may be an input field of a transactional website.

In some embodiments, the steps of detecting the input field, receiving the one-time password, and populating the input field may be performed by a password-management application that is installed on the first computing device, and the steps of identifying the message and transmitting the one-time password may be performed by a password-management application that is installed on the second computing device.

In some embodiments, the password-management application that is installed on the first computing device and the password-management application that is installed on the second computing device may be client applications of a password-management service that manages an account of the user, and the first computing device and the second computing device may have been associated with the account of the user. In certain embodiments, the step of detecting the input field may include sending, from the first computing device to the password-management service, a request for the one-time password. The password-management service may relay this request to the second computing device, and the second computing device may identify the message in response to receiving the request from the password-management service. In at least one embodiment, the one-time password may be sent from the second computing device to the first computing device via the password-management service.

In some embodiments, the computer-implemented method may further include (1) receiving, at the password-management service, the request from the first computing device, (2) identifying, at the password-management service, the account of the user that is associated with the first computing device, (3) using the account of the user to determine, at the password-management service, that the second computing device is associated with the account of the user, and (4) relaying, from the password-management service in response to determining that the second computing device is associated with the account of the user, the request to the second computing device.

In some embodiments, the step of transmitting the one-time password from the second computing device to the first computing device may include (1) transmitting, from the second computing device, the one-time password to the password-management service, (2) receiving, at the password-management service, the one-time password from the second computing device, and (3) transmitting, from the password-management service, the one-time password to the first computing device.

In some embodiments, the step of identifying the message may include identifying, at the second computing device, a message that was most recently received at the second computing device, and the step of transmitting the one-time password may include extracting the one-time password from the message that was most recently received at the second computing device. In certain embodiments, the step of identifying the message may include identifying, at the second computing device, a message that was most recently received at the second computing device, and the step of transmitting the one-time password may include transmitting the message that was most recently received at the second computing device from the second computing device to the first computing device. In at least one embodiment, the step of identifying the message may be performed in response to receiving, at the second computing device, a notification that indicates that the one-time password is required at the first computing device.

In one embodiment, a system for implementing the above-described method may include (1) a detecting module, stored in memory, that detects, at a first computing device of a user, an input field that requires a one-time password that is included in a message that is sent by a one-time-password provider to a second computing device of the user, (2) an identifying module, stored in memory, that identifies, at the second computing device, the message that includes the one-time password, (3) a transmitting module, stored in memory, that transmits the one-time password from the second computing device to the first computing device, (4) a receiving module, stored in memory, that receives, at the first computing device, the one-time password, (5) a populating module, stored in memory, that automatically populates, at the first computing device, the input field with the one-time password, and (6) at least one processor that executes the detecting module, the identifying module, the transmitting module, the receiving module, and the populating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, at a first computing device of a user, an input field that requires a one-time password that is included in a message that is sent by a one-time-password provider to a second computing device of the user, (2) identify, at the second computing device, the message that includes the one-time password, (3) transmit the one-time password from the second computing device to the first computing device, (4) receive, at the first computing device, the one-time password, and (5) automatically populate, at the first computing device, the input field with the one-time password.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
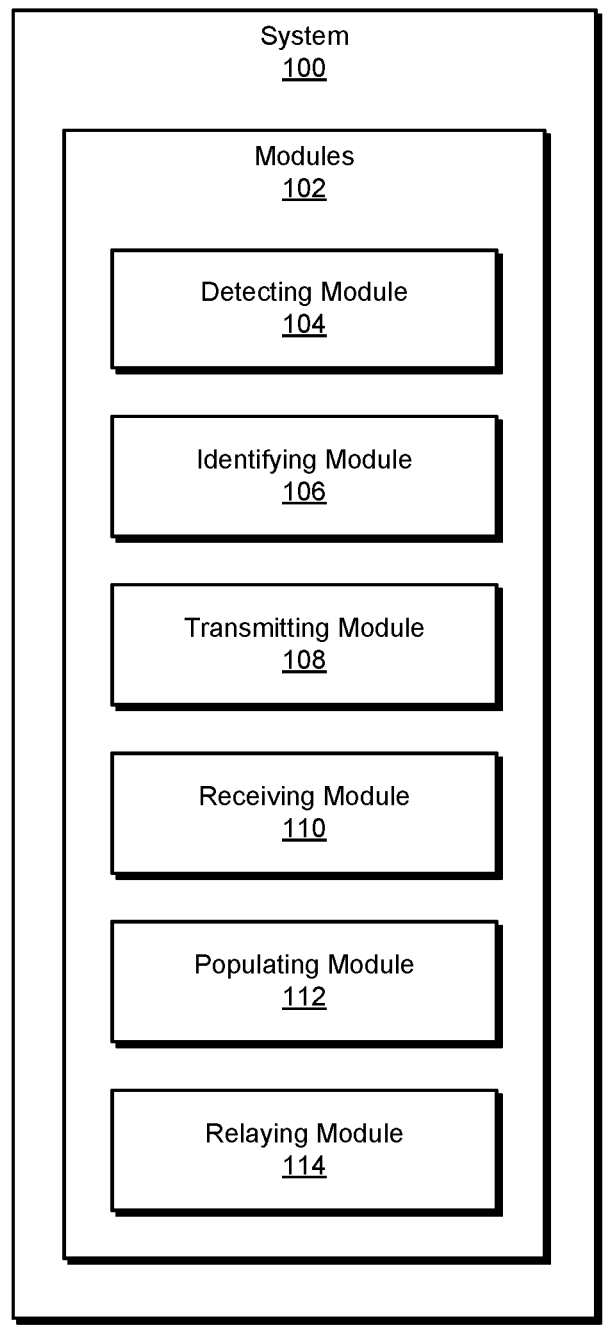
FIG. 1 is a block diagram of an exemplary system for automatically populating one-time-password input fields.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automatically populating one-time-password input fields. As will be explained in greater detail below, by using a mobile application that is installed on a user's mobile phone to relay a one-time password that is received in an SMS message to the user's personal computer on which the user is required to provide the one-time password to an input field of a website or application, the systems and methods described herein may enable a password manager installed on the user's personal computer to automatically fill the one-time password into the input field for the user. By automatically retrieving a one-time password from a user's mobile phone and filling the one-time password into the input field that requests it, these systems and methods may relieve the user from the burden of having to manually retrieve the one-time password from the user's mobile phone and enter the one-time password into the input field. Moreover, by automatically retrieving a one-time password from a user's mobile phone, these systems and methods may enable the user to perform a transaction via a website or application that requires the one-time password even when the user is not currently in possession of the user's mobile phone. Embodiments of the instant disclosure may also provide various other advantages and features, as discussed in greater detail below.

Figure 2:
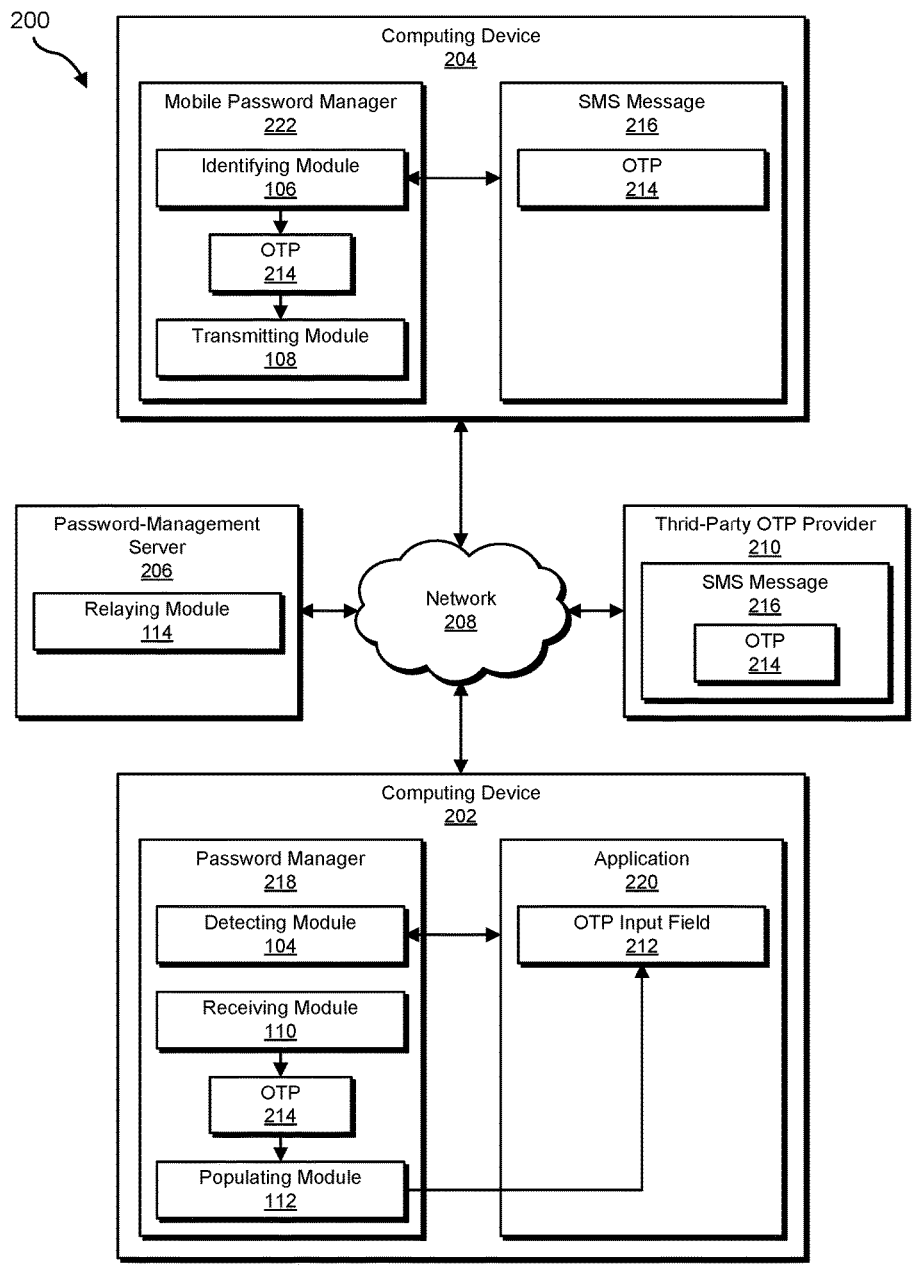
FIG. 2 is a block diagram of an additional exemplary system for automatically populating one-time-password input fields.

The following will provide, with reference to FIGS. 1-2, detailed descriptions of exemplary systems for automatically populating one-time-password input fields. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for automatically populating one-time-password input fields. As illustrated in this figure, exemplary system 100 may include one or more modules 102 for performing one or more tasks. For example, and as will be explained in greater detail below, exemplary system 100 may include a detecting module 104 that detects, at a first computing device of a user, an input field that requires a one-time password that is included in a message that is sent by a one-time-password provider to a second computing device of the user. Exemplary system 100 may also include an identifying module 106 that identifies, at the second computing device, the message that includes the one-time password. Exemplary system 100 may further include a transmitting module 108 that transmits the one-time password from the second computing device to the first computing device.

In addition, and as will be described in greater detail below, exemplary system 100 may include a receiving module 110 that receives, at the first computing device, the one-time password. Exemplary system 100 may also include a populating module 112 that automatically populates, at the first computing device, the input field with the one-time password. Exemplary system 100 may further include a relaying module 114 that relays the one-time password from the second computing device to the first computing device. Although illustrated as separate elements, one or more of modules 102 in FIG. 1 may represent portions of a single module or application. In some examples, one or more of modules 102 in FIG. 1 may represent portions of a password-management application. For example, one or more of modules 102 in FIG. 1 may represent portions of a client application of a password-management service.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing device 204, and/or password-management server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 and a computing device 204 in communication with a password-management server 206 via a network 208. In one example, computing device 202 and computing device 204 may be programmed with one or more of modules 102. Additionally or alternatively, password-management server 206 may be programmed with one or more of modules 102.

In one embodiment, one or more of modules 102 from FIG. 1 may, when executed by at least one processor of computing device 202, computing device 204, and/or password-management server 206, enable computing device 202, computing device 204, and/or password-management server 206 to automatically populate one-time-password input fields. For example, and as will be described in greater detail below, one or more of modules 102 may cause computing device 202, computing device 204, and/or password-management server 206 to (1) detect, at computing device 202, an OTP input field 212 that requires a OTP 214 that is included in a SMS message 216 that is sent by a third-party OTP provider 210 to computing device 204, (2) identify, at computing device 204, SMS message 216 that includes OTP 214, (3) transmit OTP 214 from computing device 204 to computing device 202, (4) receive, at computing device 202, OTP 214, and (5) automatically populate, at computing device 202, OTP input field 212 with OTP 214.

Computing device 202 and computing device 204 generally represents any type or form of computing device capable of reading computer-executable instructions. Examples of computing device 202 and computing device 204 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

In some examples, computing device 202 may represent a personal computer of a user. As shown in FIG. 2, a password manager 218 and an application 220 may be installed on computing device 202. Password manager 218 generally represents any application that may be used to manage and secure a user's credentials (e.g., usernames and passwords) and/or that may be used by a user to automatically enter the user's credentials into input fields that require them. In at least one example, password manager 218 may represent a client application of a password-management service (e.g., SYMANTEC's NORTON IDENTITY SAFE). Application 220 generally represents any application that may display an input field to a user that requires a one-time password. In some examples, application 220 may represent a web browser with which a user accesses a website that includes OTP input field 212.

In some examples, computing device 204 may represent a mobile phone of a user that is capable of receiving SMS messages (e.g., SMS message 216) from remote third parties. As shown in FIG. 2, a mobile password manager 222 may be installed on computing device 204. Mobile password manager 222 generally represents any mobile-phone application that may be used to manage and secure a user's credentials (e.g., usernames and passwords) and/or that may be used by a user to automatically enter the user's credentials into input fields that require them. In at least one example, mobile password manager 222 may represent a client application of a password-management service.

Password-management server 206 generally represents any type or form of computing device that is capable of reading computer-executable instructions. Examples of password-management server 206 include, without limitation, application servers and database servers configured to provide various database services and/or run certain software applications. In some examples, password-management server 206 may represent a portion of a service that manages and secures a user's credentials across a user's devices. For example, using password manager 218 and mobile password manager 222, password-management server 206 may synchronize a user's credentials on computing device 202 and computing device 204. In at least one example, password-management server 206 may represent a server that provides various services of SYMANTEC's NORTON IDENTITY SAFE.

Network 208 generally represents any medium or architecture capable of facilitating communication or data transfer. Examples of network 208 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 208 may facilitate communication or data transfer using wireless or wired connections. In one embodiment, network 208 may facilitate communication between computing device 202, computing device 204, and password-management server 206.

Third-party OTP provider 210 generally represents any medium or architecture capable of generating and sending one-time passwords. In some examples, third-party OTP provider 210 may represent a portion of an application or a website with which a user interacts and to which the user must provide one-time passwords to perform various actions or transactions. In other examples, third-party OTP provider 210 may represent a portion of a service that may be used by an application or a website to generate, send, and verify one-time passwords for the purpose of securing information and/or services offered by the application or website. In at least one example, third-party OTP provider 210 may be configured to send one-time passwords via SMS messages (e.g., SMS message 216).

Figure 3:
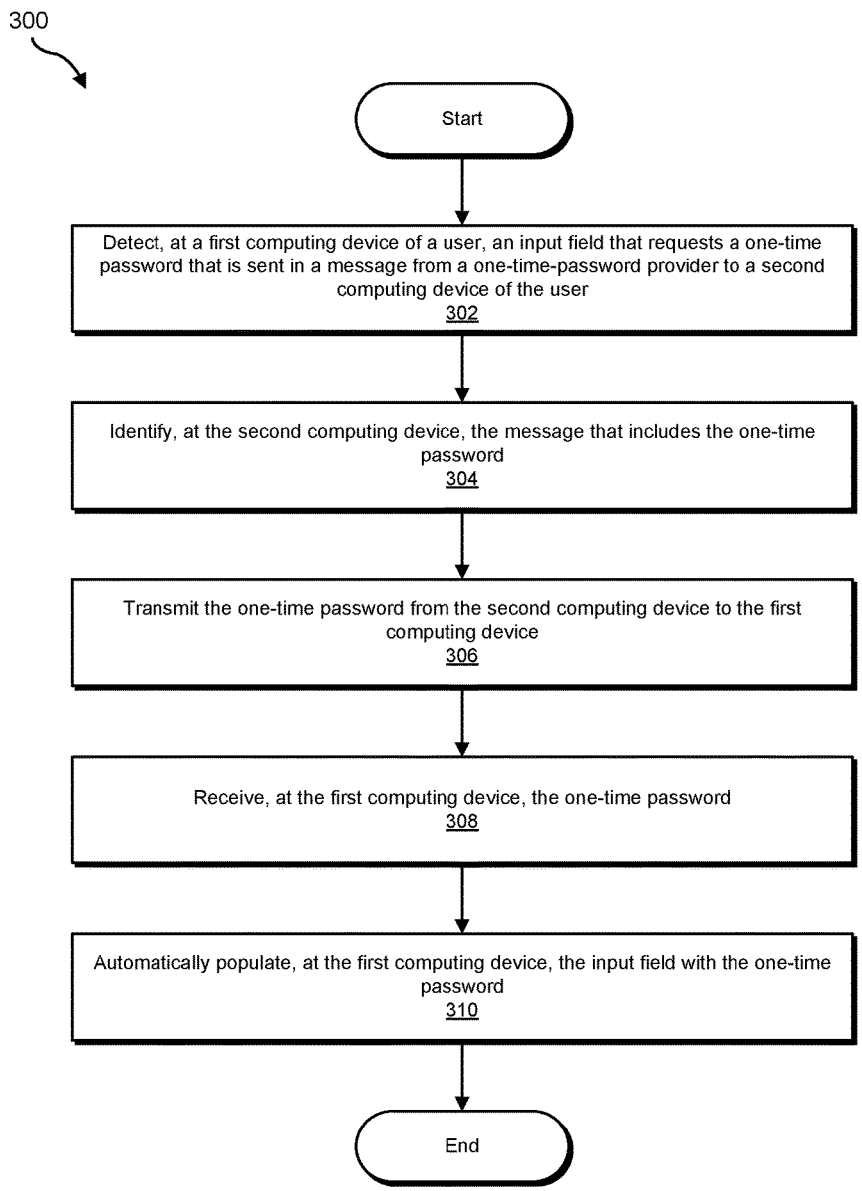
FIG. 3 is a flow diagram of an exemplary method for automatically populating one-time-password input fields.

FIG. 3 is a flow diagram of an exemplary computer-implemented method 300 for automatically populating one-time-password input fields. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect, at a first computing device of a user, an input field that request a one-time password that is sent in a message from a one-time-password provider to a second computing device of the user. For example, detecting module 104 may, as part of computing device 202 in FIG. 2, detect OTP input field 212 that requires OTP 214 that is included in SMS message 216 that is sent by third-party OTP provider 210 to computing device 204.

Figure 4:
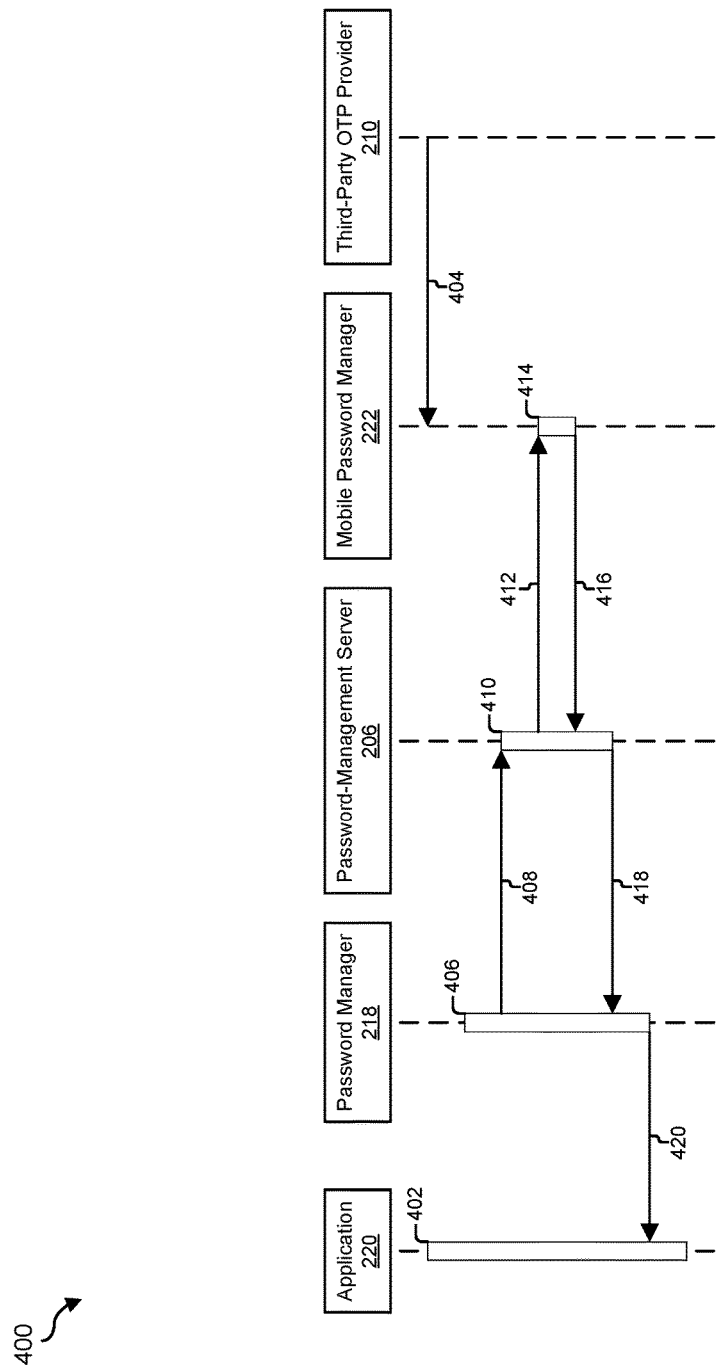
FIG. 4 is a diagram of a sequence for automatically populating one-time-password input fields.

As used herein, the term "one-time password" generally refers to a password that is used once and cannot be reused. The term "input field" generally refers to any element of a graphical user interface that accepts a one-time password. In some examples, a one-time password may be used to perform multi factor authentications. For example, in addition to a username and password, a one-time password may be required by a website in order to login to the website. In other examples, a one-time password may be required by a website in order to perform certain actions or transactions (e.g., banking transactions). A user may be sent a one-time password whenever the user encounters an input field that requests the one-time password. In some examples, a one-time-password provider may send a message (e.g., a SMS message or an email message) to the user that includes the one-time password. FIG. 4 is a sequence diagram that illustrates the steps by which the systems and methods described herein may automatically populate an input field that a user encounters with the one-time password that is required by the input field. As shown in FIG. 4, a user of computing device 202 may encounter OTP input field 212 at step 402, and third-party OTP provider 210 may send SMS message 216 that includes OTP 214 to computing device 204 at step 404. At step 406, detecting module 104 may detect that the user has encountered OTP input field 212.

Returning to FIG. 3, the systems described herein may detect an input field that requires a one-time password in any suitable manner. In one example, detecting module 104 may detect an input field that requires a one-time password by (1) monitoring the input fields that a user encounters and (2) detecting a pattern that identifies input fields that require one-time passwords. For example, detecting module 104 may detect, while a user uses a web browser, an input field of a website that requires a one-time password by (1) monitoring the input fields that the user encounters using the web browser and (2) detecting a pattern within a webpage of the website that identifies the input field on the webpage.

In some examples, after detecting that a user has encountered an input field that requires a one-time password, detecting module 104 may send a request for the one-time password to a password-management service that manages an account of the user that is associated with the user's personal computer on which the input field has been encountered and the user's mobile phone to which the one-time password has or will be sent. For example, as shown in FIG. 4, after detecting module 104 detects, at step 406 as part of password manager 218, that a user encountered OTP input field 212 at step 402, detecting module 104 may, at step 408 as part of password manager 218, send a request for OTP 214 from computing device 202 to password-management server 206.

After receiving a request for a one-time password from a user's personal computer, detecting module 104 may, as part of a password-management service, identify a user account that is associated with the user's personal computer, use the account to identify the user's mobile phone, and relay, from the password-management service, the request for the one-time password to the user's mobile phone. For example, as shown in FIG. 4, after receiving a request from computing device 202 for OTP 214 at step 410, relaying module 114 may, as part of password-management server 206, identify a user account that is associated with computing device 202, use the account to identify computing device 204, and relay, from password-management server 206, the request for OTP 214 to computing device 204 at step 412.

At step 304, one or more of the systems described herein may identify, at the second computing device, the message that includes the one-time password. For example, identifying module 106 may, as part of computing device 204 in FIG. 2, identify SMS message 216 that includes OTP 214.

As used herein, the term "message" generally refers to any message that may contain a one-time password and that may be sent to a user's computing device. Examples of messages that may contain one-time passwords include, without limitation, text messages (e.g., SMS messages), multimedia messages (e.g., Multimedia-Messaging-Service (MMS) messages), and email messages. In general, when a user encounters an input field that requests a one-time password, a one-time-password provider may send the one-time password to a device that was registered by the user with the one-time-password provider. For example as shown in FIG. 4, at step 404, third-party OTP provider 210 may send SMS message 216 to computing device 204 in response to the user of computing device 202 encountering OTP input field 212 at step 402.

The systems described herein may identify a message that includes a one-time password in any suitable manner. In general, identifying module 106 may identify, at a mobile phone, a message that includes a one-time password in response to receiving a request for the one-time password or in response to receiving a notification that a message containing a one-time password has been or should be received on the mobile phone. Using FIG. 4 to illustrate, identifying module 106 may identify SMS message 216 at step 414 in response to the request sent by password-management server 206 at step 412.

In some examples, identifying module 106 may identify a message that may include a one-time password by identifying the last message that was received at a mobile phone before identifying module 106 received a request to fetch the one-time password. In other examples, a request for a one-time password may contain information that may be used to identify the message that includes the one-time password. For example, a request may include information that identifies the sender of the message that includes the one-time password. In these examples, identifying module 106 may identify the message that includes the one-time password by identifying the last message that was received at the mobile phone from the specified sender. In other examples, a request may include a pattern that identifies the message that includes the one-time password. In these examples, identifying module 106 may identify the message that includes the one-time password by identifying the last message that was received at the mobile phone that matches the pattern.

At step 306, one or more of the systems described herein may transmit the one-time password from the second computing device to the first computing device. For example, transmitting module 108 may, as part of computing device 204 in FIG. 2, transmit OTP 214 from computing device 204 to computing device 202.

The systems described herein may perform step 306 in any suitable manner. In some examples, transmitting module 108 may transmit a one-time password directly from a user's mobile phone to the user's personal computer. Additionally or alternatively, transmitting module 108 may relay a one-time password from a user's mobile phone to the user's personal computer through a server of a password-management service. In these examples, relaying module 114 may, as part of the server, transmit the one-time password to the user's personal computer as soon as it is received at the server. Using FIG. 4 to illustrate, after identifying module 106 identifies SMS message 216 at step 414, transmitting module 108 may transmit OTP 214 to password-management server 206 at step 416. In response to receiving OTP 214 from computing device 204, relaying module 114 may, as part of password-management server 206, transmit OTP 214 to computing device 202 at step 418.

In some examples, transmitting module 108 may extract a one-time password from the message in which it is contained before transmitting the one-time password to a user's personal computer. In other examples, transmitting module 108 may transmit the one-time password to a user's personal computer by transferring all or a portion of the message to the user's personal computer.

At step 308, one or more of the systems described herein may receive, at the first computing device, the one-time password. For example, receiving module 110 may, as part of computing device 202 in FIG. 2, receive OTP 214. The systems described herein may perform step 308 in any suitable manner. At step 310, one or more of the systems described herein may automatically populate, at the first computing device, the input field with the one-time password. For example, populating module 112 may, as part of computing device 202 in FIG. 2, automatically populate OTP input field 212 with OTP 214. Using FIG. 4 to illustrate, after receiving module 110 receives OTP 214 from password-management server 206, populating module 112 may automatically populate OTP input field 212 with OTP 214 at step 420.

The systems described herein may automatically populate an input field with a one-time password in any suitable manner. In some examples, populating module 112 may enter a one-time password into an input field as soon as it is received without any user interaction. In other examples, populating module 112 may fill a one-time password into an input field such that a user can submit the one-time password by clicking a submit button. In at least one example, populating module 112 may automatically submit a one-time password as soon as it is entered into an input field such that a user is unburdened from having to enter and submit the one-time password. Upon completion of step 310, exemplary method 300 in FIG. 3 may terminate.

As explained above, by using a mobile application that is installed on a user's mobile phone to relay a one-time password that is received in an SMS message to the user's personal computer on which the user is required to provide the one-time password to an input field of a website or application, the systems and methods described herein may enable a password manager installed on the user's personal computer to automatically fill the one-time password into the input field for the user. By automatically retrieving a one-time password from a user's mobile phone and filling the one-time password into the input field that requests it, these systems and methods may relieve the user from the burden of having to manually retrieve the one-time password from the user's mobile phone and enter the one-time password into the input field. Moreover, by automatically retrieving a one-time password from a user's mobile phone, these systems and methods may enable the user to perform a transaction via a website or application that requires the one-time password even when the user is not currently in possession of the user's mobile phone.

In at least one example, the systems described herein may be configured as client password-managing applications of a password-management service. These client password-managing applications may be installed on a mobile phone and a personal computer of a user, and the password-management service may register these computing devices with an account of the user. Whenever the user uses the user's personal computer to visit a website that requires a one-time password, the user's registered mobile phone may get the one-time password in a text message. In some examples, the client password-managing application installed on the mobile phone may receive a push notification from the password-management service indicating that the user's registered mobile phone received the one-time password via the text message. The client password-managing application may then get the one-time password from the text message and may send the one-time password to the password-management service. Next, the password-management-service may relay the one-time password to the client password-managing application installed on the user's personal computer, and the client password-managing application on the user's personal computer may autofill the one-time password as required.

Figure 5:
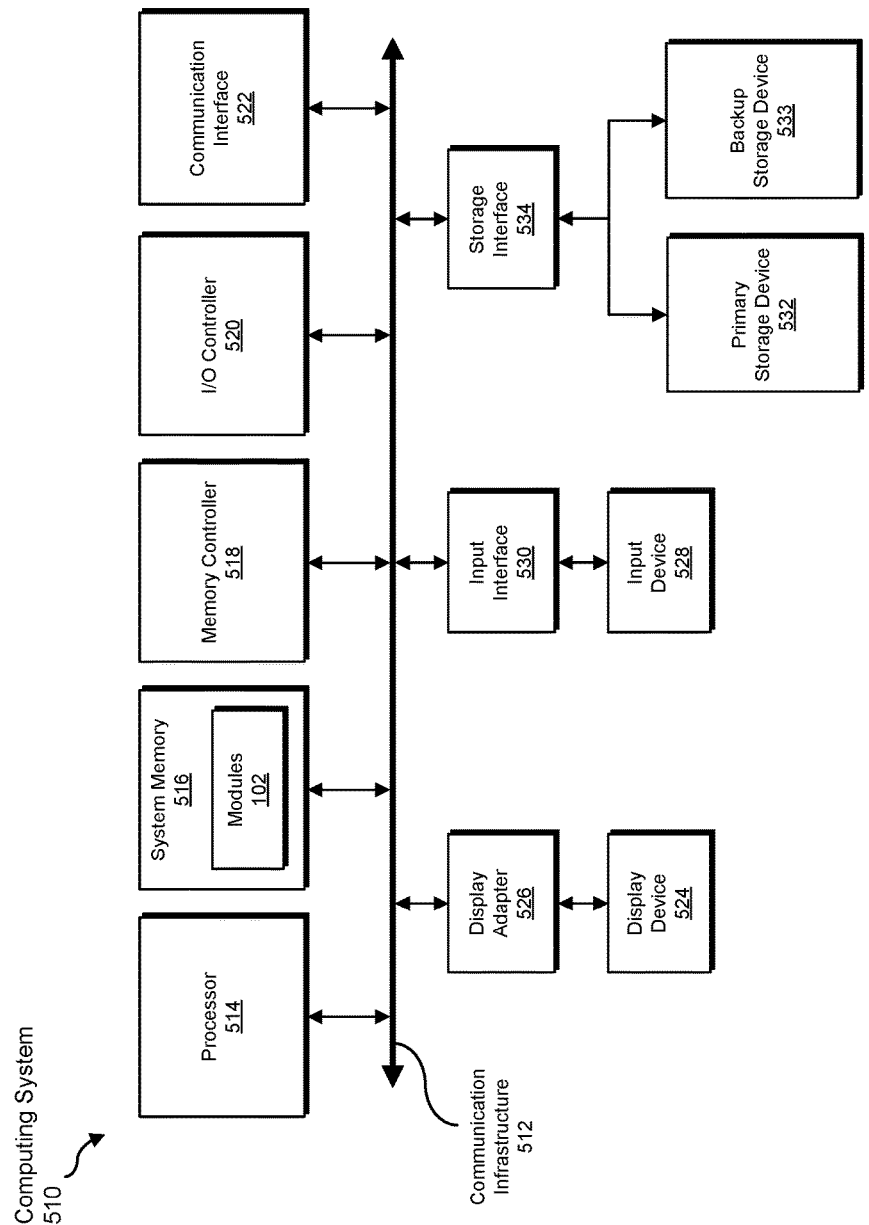
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
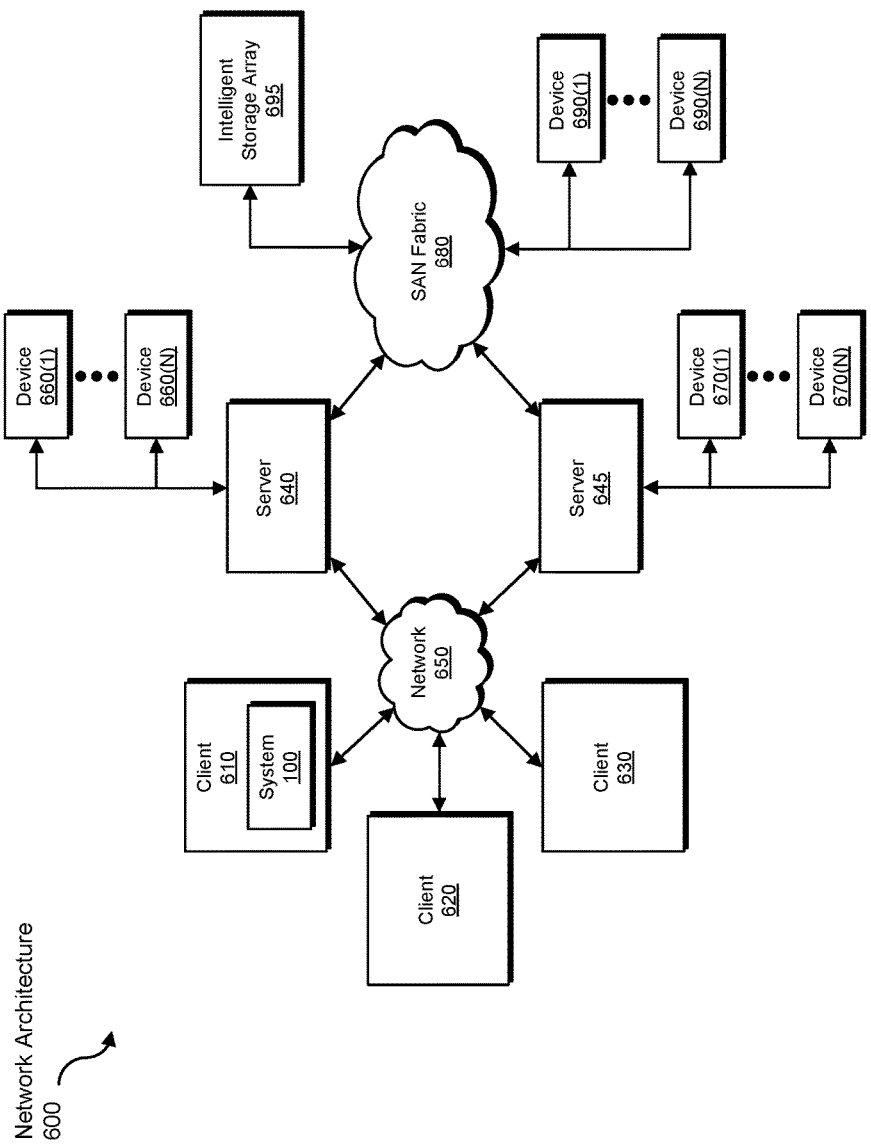
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for automatically populating one-time-password input fields.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a message that was sent to a mobile phone of a user and that contains a one-time password that is needed at a personal computer of the user, transform the message into the one-time password, output a result of the transformation to the personal computer of the user, and use the result of the transformation to automatically populate, at the personal computer, an input field that requests the one-time password. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically populating one-time-password input fields, at least a portion of the method being performed by a computing device comprising at least one processor, the method comprising:
    detecting, at a first computing device of a user, an input field that requires a one-time password, wherein a one-time-password provider sends a message that comprises the one-time password to a second computing device of the user;
    identifying, at the second computing device, the message that comprises the one-time password;
    in response to identifying the message that comprises the one-time password, automatically initiating transmission, by the second computing device, of the one-time password from the second computing device to the first computing device;
    receiving, at the first computing device, the one-time password; and
    automatically populating, at the first computing device, the input field with the one-time password.

2. The computer-implemented method of claim 1, wherein:
    the steps of detecting the input field, receiving the one-time password, and populating the input field are performed by a password-management application that is installed on the first computing device;
    the steps of identifying the message and transmitting the one-time password are performed by a password-management application that is installed on the second computing device.

3. The computer-implemented method of claim 2, wherein:
    the password-management application that is installed on the first computing device and the password-management application that is installed on the second computing device are client applications of a password-management service that manages an account of the user;
    the first computing device and the second computing device have been associated with the account of the user;
    detecting the input field comprises sending, from the first computing device to the password-management service, a request for the one-time password;
    the password-management service relays the request to the second computing device;
    the password-management application that is installed on the second computing device identifies the message in response to receiving the request from the password-management service;
    the one-time password is sent from the second computing device to the first computing device via the password-management service.

4. The computer-implemented method of claim 3, further comprising:
    receiving, at the password-management service, the request from the first computing device;
    identifying, at the password-management service, the account of the user that is associated with the first computing device;
    using the account of the user to determine, at the password-management service, that the second computing device is associated with the account of the user;
    relaying, from the password-management service in response to determining that the second computing device is associated with the account of the user, the request to the second computing device.

5. The computer-implemented method of claim 3, wherein transmitting the one-time password from the second computing device to the first computing device comprises:
    transmitting, from the second computing device, the one-time password to the password-management service;
    receiving, at the password-management service, the one-time password from the second computing device;
    transmitting, from the password-management service, the one-time password to the first computing device.

6. The computer-implemented method of claim 1, wherein:
    the first computing device comprises a personal computer of the user;
    the second computing device comprises a mobile phone of the user;
    the message comprises a short-message-service message.

7. The computer-implemented method of claim 1, wherein:
    identifying the message comprises identifying, at the second computing device, a message that was most recently received at the second computing device;
    transmitting the one-time password comprises extracting the one-time password from the message that was most recently received at the second computing device.

8. The computer-implemented method of claim 1, wherein:
    identifying the message comprises identifying, at the second computing device, a message that was most recently received at the second computing device;
    transmitting the one-time password comprises transmitting the message that was most recently received at the second computing device from the second computing device to the first computing device.

9. The computer-implemented method of claim 1, wherein the step of identifying the message is performed in response to receiving, at the second computing device, a notification that indicates that the one-time password is required at the first computing device.

10. The computer-implemented method of claim 1, wherein the input field comprises an input field of a transactional website.

11. A system for automatically populating one-time-password input fields, the system comprising:
    a detecting module, stored in memory, that detects, at a first computing device of a user, an input field that requires a one-time password, wherein a one-timepassword provider sends a message that comprises the one-time password to a second computing device of the user;

an identifying module, stored in memory, that identifies, at the second computing device, the message that comprises the one-time password;

a transmitting module, stored in memory, that in response to identifying the message that comprises the one-time password, automatically initiates transmission, by the second computing device, of the one-time password from the second computing device to the first computing device;

a receiving module, stored in memory, that receives, at the first computing device, the one-time password;

a populating module, stored in memory, that automatically populates, at the first computing device, the input field with the one-time password;

at least one processor that executes the detecting module, the identifying module, the transmitting module, the receiving module, and the populating module.

12. The system of claim 11, wherein:
the detecting module, the receiving module, and the populating module are a part of a password-management application that is installed on the first computing device;
the identifying module and the transmitting module are a part of a password-management application that is installed on the second computing device.

13. The system of claim 12, wherein:
the password-management application that is installed on the first computing device and the password-management application that is installed on the second computing device are client applications of a password-management service that manages an account of the user;
the first computing device and the second computing device have been associated with the account of the user;
the detecting module detects the input field by sending, from the first computing device to the password-management service, a request for the one-time password;
the password-management service relays the request to the second computing device;
the identifying module identifies the message in response to receiving the request from the password-management service;
the transmitting module sends the one-time password from the second computing device to the first computing device via the password-management service.

14. The system of claim 13, wherein:
the transmitting module transmits the one-time password from the second computing device to the first computing device by transmitting, from the second computing device, the one-time password to the password-management service;
the system further comprises a relaying module that:
receives, at the password-management service, the one-time password from the second computing device;
transmits, from the password-management service, the one-time password to the first computing device.

15. The system of claim 11, wherein:
the first computing device comprises a personal computer of the user;
the second computing device comprises a mobile phone of the user;
the message comprises a short-message-service message.

16. The system of claim 11, wherein:
the identifying module identifies the message by identifying, at the second computing device, a message that was most recently received at the second computing device;
the transmitting module transmits the one-time password by extracting the one-time password from the message that was most recently received at the second computing device.

17. The system of claim 11, wherein:
the identifying module identifies the message by identifying, at the second computing device, a message that was most recently received at the second computing device;
the transmitting module transmits the one-time password by transmitting the message that was most recently received at the second computing device from the second computing device to the first computing device.

18. The system of claim 11, wherein the identifying module identifies the message in response to receiving, at the second computing device, a notification that indicates that the one-time password is required at the first computing device.

19. The system of claim 11, wherein the input field comprises an input field of a transactional website.

20. A non-transitory computer-readable medium comprising one or more computer-executable instructions that, when executed by at least one processor of a computing device, cause the computing device to:
detect, at a first computing device of a user, an input field that requires a one-time password, wherein a one-time-password provider sends a message that comprises the one-time password to a second computing device of the user;
identify, at the second computing device, the message that comprises the one-time password;
in response to identifying the message that comprises the one-time password, automatically initiate transmission, by the second computing device, of the one-time password from the second computing device to the first computing device;
receive, at the first computing device, the one-time password;
automatically populate, at the first computing device, the input field with the one-time password.

* * * * *